INVENTOR.
CLEM A. BARRERE, JR.
DANNY D. CAUDLE
BY
Van D. Harrison, Jr.
AGENT

United States Patent Office 3,632,504
Patented Jan. 4, 1972

3,632,504
GAS TREATING PROCESS
Clem A. Barrere, Jr., Houston, Tex., and Danny D. Caudle, Ponca City, Okla., assignors to Continental Oil Company, Ponca City, Okla.
Filed Sept. 8, 1969, Ser. No. 855,875
Int. Cl. C10g 25/00, 5/02
U.S. Cl. 208—310    6 Claims

ABSTRACT OF THE DISCLOSURE

Discloses a gas treating process utilizing two or three adsorber beds in which the inlet feed gas is enriched by adding a stream of gas rich in the component it is desired to extract in the adsorber bed. Enrichment of the inlet feed gas in desired components increases the recovery of those components in the product obtained when the adsorber bed is regenerated. One source of enrichment is the gas from a bed in a closed heating and regenerating circuit.

BACKGROUND OF THE INVENTION

(1) Field of the invention

Figure 1:
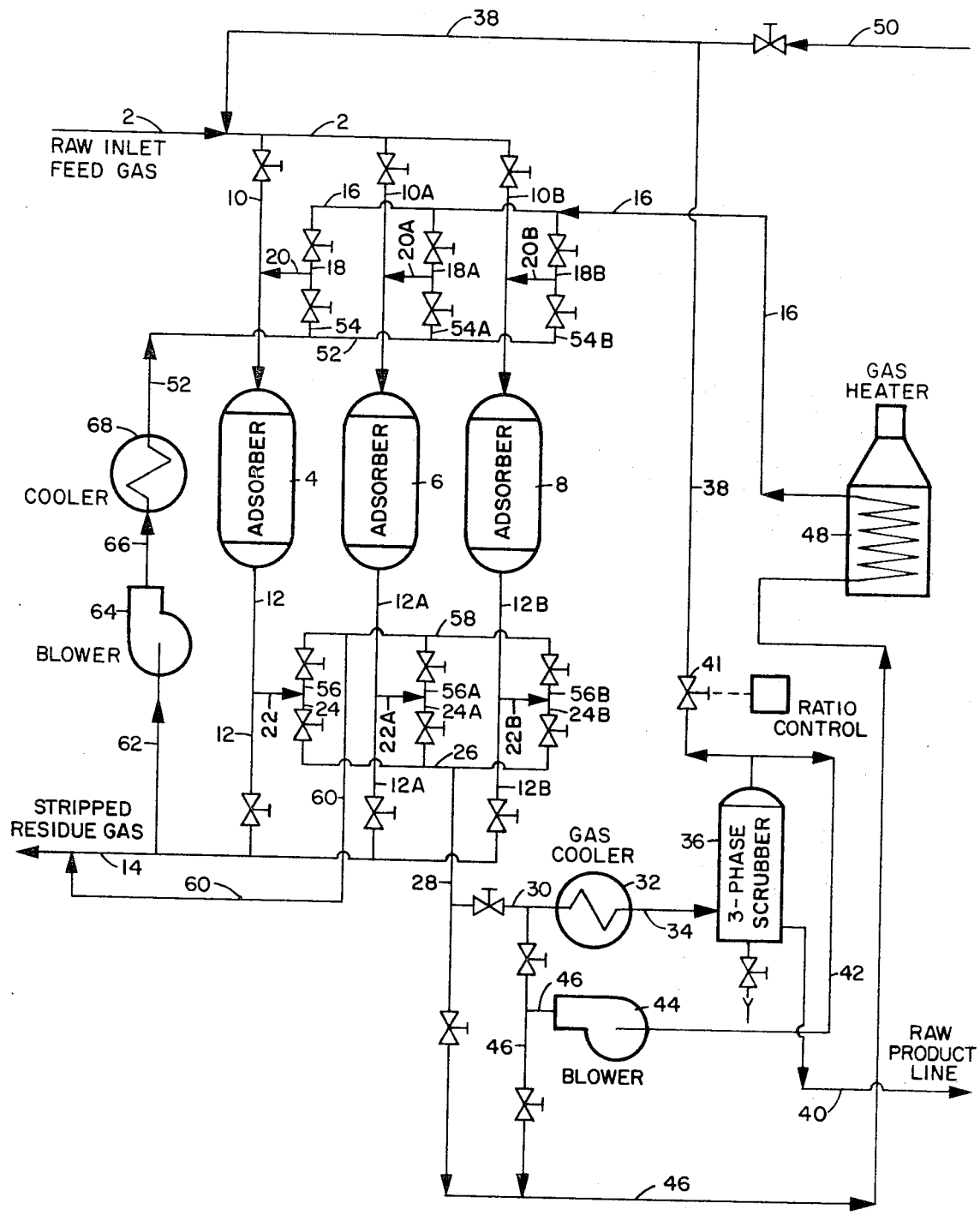

This invention relates to the separation of desired components from a gas stream by sorption. More specifically, it relates to a method for increasing the recovry of desired components from a gas stream through use of absorbent beds.

(2) Prior art

The separation of vaporized condensables from a stream of gas by flowing the gas stream through a bed of adsorbent material is a widely known and practiced process. An example is the removal of propane and heavier hydrocarbons from hydrocarbon gas streams. Ordinarily, after a bed has become saturated with the adsorbed condensables, the bed is regenerated by heating it with a stream of circulating hot gas. The adsorbed condensables are vaporized, leaving a dry heated bed of adsorbent. Usually the bed then is cooled to sorption temperature by flowing a stream of cool dry gas through it. In the heating or regenerating system, the vaporized condensables are recondensed, collected and removed from the system. Usually a cyclical process is employed utilizing two or three beds which sequentially go through steps of adsorption, desorption by heating, and cooling to adsorption temperature.

More recently, processes have been developed in which gas components not condensable at atmospheric temperatures and pressures are removed from a feed gas stream by sorption in an adsorbent bed. The adsorbent bed is then stripped of gases by heating in a closed circuit. In the closed circuit heating of the adsorbent bed, a portion of the enriched regeneration gas is removed in the gaseous phase, thus providing a gas product enriched in those noncondensable components adsorbed from the feed gas stream.

The efficiency of either of these processes depends primarily upon the concentration of the adsorbable components in the feed gas stream going to the adsorbent bed which is in the adsorption phase of the process. In many instances, gas streams having valuable adsorbable components are available but the concentration of valuable components is too low to make recovery through use of adsorbent beds economically feasible.

An object of this invention is to increase the recovery of desired components from a gas stream. Another object of this invention is to control the purity of the product recovered from the heating circuit. Another object of this invention is to provide a method for recovering valuable components from gas streams having a low concentration of such components not economically feasible for recovery by present standards.

(3) Summary of the invention

Briefly stated, our invention comprises adding to the feed gas stream, prior to its passage through a sorbent bed in the sorption phase, a second stream of gas rich in those components it is desired to extract from the feed gas stream. The effect of adding this enriched second stream is to increase the concentration of desired components in the feed gas stream. Because the adsorption of components by a bed of adsorbent material is proportional to the concentration of those components in the feed gas, their adsorption rate will be increased accordingly. Our invention is applicable to two or three-bed sorption systems in which either liquid or gaseous products are recovered as a product from the regeneration phase of the process.

(4) Brief description of the figures

Figure 2:
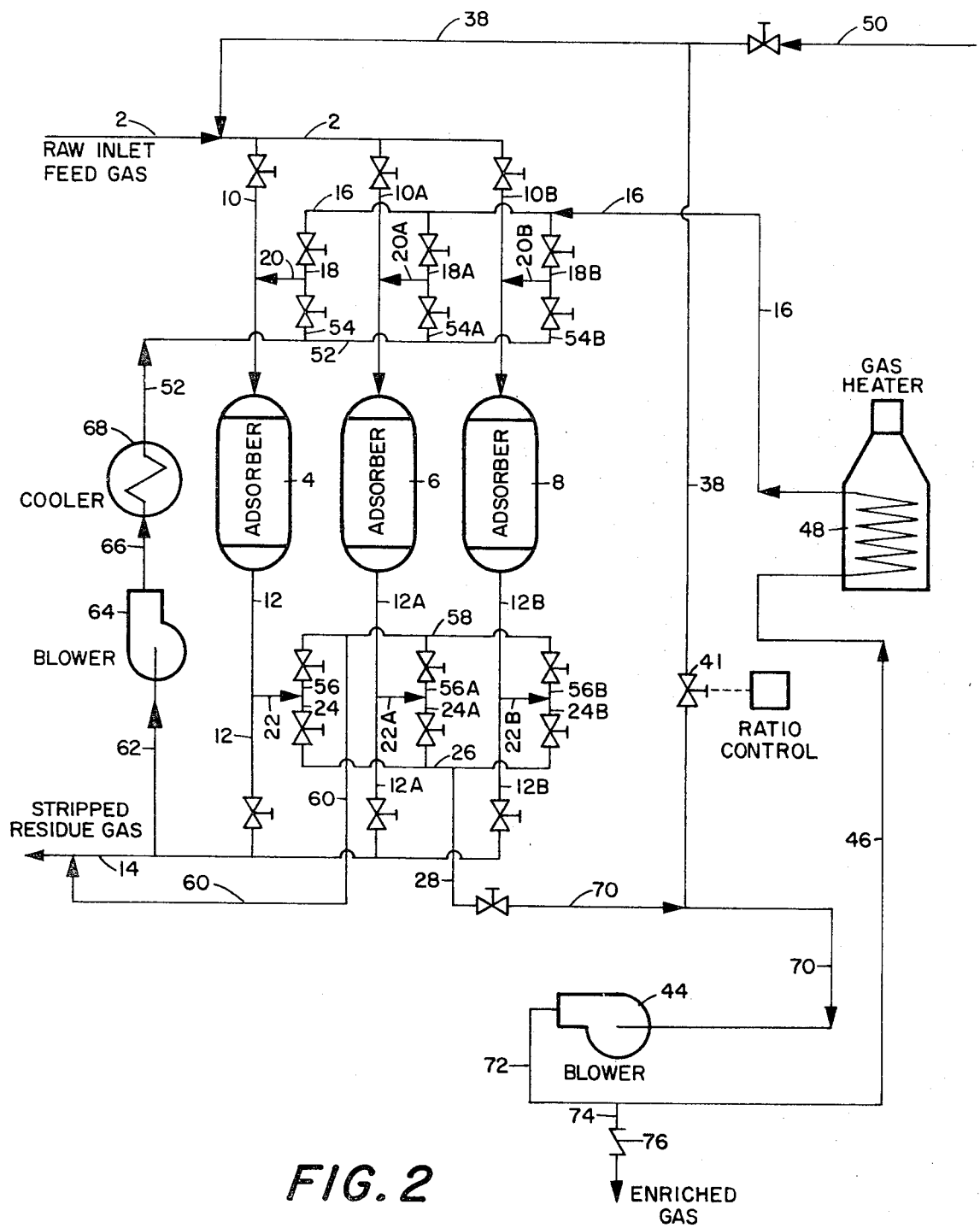

FIG. 1 depicts one application of our process to the recovery of condensable liquids from a gas stream. FIG. 2 depicts a modification of FIG. 1 to provide a system for recovering a gas product enriched in desired condensables from the heating system.

(5) Description of preferred embodiments

For purposes of clarity in understanding our invention, the term "cycle" should be considered as including a sequence of operations in which one bed in the sorption phase adsorbs components from a raw inlet feed gas, while simultaneously a second bed in the heating or regeneration phase is regenerated (adsorbed components are vaporized from it). In a three-bed system, a third bed simultaneously is cooled. In a two-bed system, the second bed may be both regenerated by heating and subsequently cooled to sorption temperature while the first bed is in sorption service. Each cycle may also include a purge step in which rich gas contained in the hot, regenerated sorbent bed is displaced into another bed to prevent loss of the rich gas contained in the interstices of the heated regenerated bed.

Further description of our invention is based on the use of the three-bed system in the recovery of hydrocarbons from a hydrocarbon feed gas stream wherein the product recovered is a liquid or gas product rich in desired hydrocarbon components. This should not, however, be construed as a limitation of our invention, since it is equally applicable to the removal of desired components from other types of gas streams.

Referring now to the drawings, FIG. 1 depicts a gas processing system in which a stripped residue gas and a liquid product are produced. Adsorbers 4, 6 and 8 are each filled with a body of particulate adsorbent material such as activated carbon. Raw hydrocarbon gas containing condensable hydrocarbons is passed into the system by way of conduit 2 to one of the adsorbers 4, 6 and 8. In this phase of the cycle, it will be assumed adsorber 4 is "on-stream" in the sorption phase and conduit 10 is in service flowing raw feed gas from conduit 2 into adsorber 4. In other cycles, conduits 10A and 10B will serve to flow feed gas from conduit 2 into adsorbers 6 and 8, respectively. Residue gas flows from adsorber 4 by way of conduit 12 into conduit 14. In other cycles conduits 12A and 12B perform similar functions with adsorbers 6 and 8, respectively.

When an adsorber in FIG. 1 is saturated with adsorbable components from the raw hydrocarbon feed gas stream, the adsorber is regenerated. Let it be supposed that adsorber 8 has been saturated from a previous cycle and is in the "heating" or "regenerating" phase. Hot gas is flowed from conduit 16 through conduits 18B, 20B and 10B into adsorber 8. The hot gas in flowing through adsorber 8 heats the adsorbent material contained therein, vaporizing adsorbed condensables into the gas stream. In other cycles, conduits 18, 20 and 10 and conduits 18A, 20A and 10A function similarly for adsorbers 4 and 6, respectively. The hot gas containing vaporized condensables flows from adsorber 8 through conduits 12B, 22B and 24B into conduits 26, 28 and 30. In other cycles, conduits 12, 22 and 24 and conduits 12A, 22A and 24A serve similar purposes for adsorbers 4 and 6, respectively. The heated gas flows from conduit 30 and is cooled in cooler 32 where vaporized condensables from adsorber 8 are condensed and collected in separator 36 after passage from conduit 34. The desired liquid product collected in separator 36 is removed through conduit 40.

The cool overhead gas from separator 36 flows into conduit 42 where a portion of the gas is diverted into conduit 38 and recycled to the raw inlet feed gas stream in conduit 2. This represents one embodiment of our invention. The gas flowing in conduit 42 has a high concentration of the hydrocarbon condensables which it is desired to extract from the raw feed gas. This is true even though the gas has been cooled and condensed liquids separated. For example, the two streams of gases in a process according to FIG. 1 for recovering propane and heavier hydrocarbons might have the following composition. The increased concentration of the heavier hydrocarbons in the regeneration gas stream is readily apparent.

TABLE 1

| | Mole percent | | | | | |
|---|---|---|---|---|---|---|
| | $C_1$ | $C_2$ | $C_3$ | $C_4$ | $C_5$ | $C_6$ |
| Raw feed gas (Conduit 2) | 91.55 | 4.95 | 2.08 | 0.92 | 0.27 | 0.23 |
| Cooled regeneration gas (Conduit 42) | 59.18 | 21.41 | 13.33 | 4.76 | 0.94 | 0.38 |

The relative amount of a particular component adsorbed from the raw hydrocarbon feed gas as it flows through an adsorber is proportional to the concentration of that component in the feed gas stream. Accordingly, an increase in the concentration of desirable condensables in that stream will result in increased adsorption of that fraction in the adsorber and a corresponding increase in the concentration of that component in the liquid product produced at conduit 40. Increasing the concentration of desired components in the raw feed gas stream also has the effect of depressing the relative amounts of undesired condensables adsorbed in the adsorber in the sorption circuit. Accordingly, if a gas rich in condensables, such as a portion of the regeneration gas in conduit 42, is added to the raw inlet gas, the concentration of condensables adsorbed will be increased and the concentration of undesired condensables suppressed.

The ratio of the volume of gas diverted from the regeneration system to that recirculated to the heater will, of course, vary with the design of each recovery system and composition of the feed gas. In FIG. 1 the ratio of gas circulated into the regeneration gas stream to that returned back to the raw feed inlet is controlled by a ratio control valve 41 which controls the ratio of gas flowing in conduit 38 to that flowing in conduit 42. The ratio is either maintained constant or it may be varied in accordance with the changing composition of the regenerating gas stream as the adsorber bed in the regeneration phase becomes heated. As the temperature of adsorber 8 increases, the less volatile adsorbed components are vaporized so that the molecular composition of the regeneration gas changes and the average molecular weight increases.

That portion of the regeneration gas not recycled to the raw feed gas line 2 flows through conduit 42, blower 44 and conduit 46 to heater 48. There the gas is heated and returned to conduit 16 for recycle through adsorber 8.

In some instances it may be desirable to recirculate all the heating gas through adsorber 8 and to utilize an outside source of enriched gas to be added to the feed gas stream. In that event valve 41 in conduit 38 is kept closed and an enriched gas is introduced into conduit 38 through valved conduit 50. In the recovery of hydrocarbons for example, it may be desirable to add a single component hydrocarbon having between 2 and 6 carbon atoms per molecule.

In the three-bed adsorber systems, representd by FIG. 1, adsorber 6 is the cooling phase of the cycle. Cool gas flows from conduit 52 by way of conduits 54A, 20A and 10A into adsorber 6 which, in a previous cycle, has been heated to a temperature sufficient to desorb and vaporize all the adsorbed components therein. In other cycles, conduits 54, 20 and 10 and conduits 54B, 20B and 10B serve similar functions for adsorbers 4 and 8 when they are in a cooling phase. The cooling gas flows from adsorber 6 by way of conduits 12A, 22A and 56A into conduits 58 and 60 and eventually into the residue gas line 14. The source of cooling gas is shown in FIG. 1 to be part of the residue gas from the adsorber in the sorption phase. Optionally, other sources of dry cool gas will work equally well. As shown in FIG. 1, the cool gas flows from conduit 14, through conduit 62, blower 64, conduit 66, cooler 68 and into conduit 52, completing the cooling circuit.

Ideally, each cycle of the three-bed system is timed so that, as one adsorber becomes saturated with hydrocarbon condensables, a second adsorber is cool and ready to be placed in sorption service, and the third is completely heated and ready to be cooled. The beds are then switched to their next function by an appropriate opening and closing of valves. Prior to switching the hot desorbed bed into the cooling phase, it may be desirable to displace the regeneration gas present in the heated regenerated bed into the bed about to be regenerated to conserve the rich vapors in the hot adsorber.

FIG. 2 represents a modification of the regeneration phase and circuit depicted in FIG. 1 so that the product obtained from the regeneration step is an enriched gas rather than a liquid. For example, ethane and ethylene may be recovered from admixture with methane. In the heating or regeneration circuit, the gas cooler and condenser have been removed. The adsorbed components desorbed from the adsorber during the heating phase remain in a vapor state and are removed from the system as a heated gas. The remainder of the overall process is the same. This method of gas treating to recover an enriched gas product is discussed fully in U.S. Patent 3,458,973.

If, for example, we assume adsorber 8 is being regenerated, the effluent regeneration gas from adsorber 8 flows through conduits 28 and 70 to blower 44. Conduit 38, equipped with ratio control valve, permits a portion of the gas flowing in conduit to be returned to the inlet feed gas line 2. The remainder of the regeneration gas flows from blower 44 through conduit 72 into conduit 46 which leads back to the gas heater 48. Enriched gas product is withdrawn from the closed regeneration circuit through conduit 74 and release valve 76. As discussed previously in relation to the liquid recovery system, the composition of this enriched gas product is directly affected by the composition of the inlet raw feed gas. An increase in the concentration of desired components in the raw feed gas increases the proportion of that component adsorbed in the sorption circuit and carried into the regeeration circuit. By recycling a portion of the enriched regeneration gas back to the raw feed gas, the recovery of desired components is enhanced.

In practicing our invention with a system wherein an enriched gaseous product is recovered, the phases of adsorption and cooling will be identical to those previously described for a liquid product recovery system. A purge step will usually be desirable in which gas present in the heated regenerated bed is displaced into the bed next to be regenerated. The purge step prevents loss of rich gas present in the interstices of the heated adsorber when it has been fully regenerated.

Example 1.—In a gas processing plant producing liquid propane, the raw feed gas has a composition shown in Table II and flows into conduit 2 at the rate of 30 mm. s.c.f. per day at a pressure of 500 p.s.i.a. and 100° F. The plant is designed as depicted in FIG. 1 and runs in 20-minute cycles. Each of the three adsorber beds initially is filled with 8,200 pounds of activated carbon. In each of three runs the propane concentration in the liquid product is increased by adding a stream of pure propane from conduit 40 through conduit 50 to the inlet feed gas stream so that the concentration of propane is increased to 0.75, 0.99 and 1.48 mol percent, respectively. The adsorber bed size is, of necessity, also increased. The propane concentration in the liquid product stream in conduit 40 is increased accordingly, as shown in Table II, by 4.8, 9.5 and 14.6 mol percent, respectively. This example shows that the composition of the liquid product obtained from the regeneration system can be controlled by varying the concentration of the desired product in the feed gas stream.

Table III. All the gas in excess of that necessary to maintain 800 p.s.i.g. is recycle through conduit 38 and ratio control valve 41 to the feed gas line 2. The corresponding increase in ethane and heavier gases in conduits 70 and 46 is demonstrated at line 4, Table III. Although in this particular case no product was produced through conduit 74, the data show that recycling gas from the rengeration circuit to the raw feed gas in conduit 2 results in an increase of ethane and heavier hydrocarbons in the product gas in conduit 74.

TABLE III

|  | $C_1$ | $C_2$ | $C_3$ | $C_4$ |
|---|---|---|---|---|
| (1) Feed gas composition without recycle (conduit 2) | 95.25 | 4.50 | 0.25 | Nil |
| (2) Product stream without recycle (conduit 74) | 82.96 | 16.00 | 1.00 | 0.04 |
| (3) Feed gas composition with recycle of gas from regeneration circuit (conduit 2) | 93.65 | 6.00 | 0.35 | Nil |
| (4) Product stream with recycle (conduit 74) | 80.15 | 18.00 | 1.75 | 0.10 |

TABLE II

|  | Initial feed gas composition, mol percent | Run Number I | Run Number II | Run Number III |
|---|---|---|---|---|
|  |  | Moles of propane added to 100 moles of original raw feed gas | | |
|  |  | 0.26 | 0.50 | 1.00 |
| Feed gas composition with added propane: | | | | |
| Methane | 94.0 | 93.74 | 93.52 | 93.07 |
| Ethane | 5.0 | 4.99 | 4.97 | 4.95 |
| Propane | 0.5 | 0.75 | 0.99 | 1.48 |
| i-Butane | 0.2 | 0.21 | 0.21 | 0.20 |
| n-Butane | 0.1 | 0.10 | 0.10 | 0.10 |
| Pentanes+ | 0.2 | 0.21 | 0.21 | 0.20 |
|  | Initial product composition, mol percent | | | |
| Liquid product composition: | | | | |
| Methane | 41.32 | 39.88 | 38.83 | 37.03 |
| Ethane | 21.74 | 20.70 | 19.92 | 18.72 |
| Propane | 18.47 | 23.28 | 27.94 | 33.08 |
| i-Butane | 7.39 | 6.52 | 5.74 | 4.47 |
| n-Butane | 3.69 | 3.10 | 2.73 | 2.23 |
| Pentanes+ | 7.39 | 6.52 | 5.74 | 4.47 |
| Adsorber bed size, lbs. of carbon | 8,200 | 9,100 | 9,900 | 11,500 |
| Percent propane recovery | 100 | 100 | 100 | 100 |

Example 2.—In a three-bed gas treating system in which the product recovered from the regeneration circuit is an ethane-enriched gas, as exemplified by FIG. 2, the feed gas entering conduit 2 without any recycling of product enriched gas has the composition shown in line 1, Table III. The adsorber beds are filled with activated carbon.

Feed gas flows through conduit 2 at an average pressure of 800 p.s.i.g. and a rate of 6 mm. s.c.f. per day. The operating pressure of the bed in the sorption phase is 800 p.s.i.g. at 125° F. and residue gas flows into conduit 14 at a pressure of about 800 p.s.i.g. The gas circulating through the adsorber in the regeneration phase reaches a maximum temperature of 475° F. Pressure is maintained at a maximum of 800 p.s.i.g. by releasing enriched product gas through valve 76 and conduit 74. Cooling gas flows into the heated bed at an initial temperature in conduit 52 of 120° F. and a pressure of 800 p.s.i.g. The effluent cooling gas is returned to the residue gas line downstream of the point where cooling gas is diverted from conduit 14 into the blower 67 and cooler 68. The bed being cooled is cooled from a temperature of about 440° F. to a sorption service temperature of 125° F.

Under the operating conditions of the system, the gas product produced in the heating circuit (conduit 74) without any recycle of gas from the heating circuit to the feed gas stream has the composition indicated at line 2,

Having thus described the invention, what is claimed is:
1. A cyclical method of recovering desired hydrocarbon components from a feed gas stream comprising:
   (a) providing a first body of sorbent material;
   (b) flowing said feed gas stream through said first body of sorbent material thereby adsorbing said desired hydrocarbons onto said first body of sorbent material;
   (c) flowing a heated steam of regenerating gas through a second body of sorbent material which in a previous cycle has become saturated with adsorbed desired hydrocarbons thereby vaporizing said adsorbed hydrocarbons from said sorbent body into the flow stream of said heated regenerating gas;
   (d) flowing a first portion of said stream of regenerating gas into said first feed gas stream prior to the entry of said feed gas into said first body of sorbent material so as to increase the concentration of desired components in said first feed gas stream;
   (e) recovering desired hydrocarbon components from a second portion of said stream of regenerating gas; and
   (f) periodically shifting the position of said first body of sorbent material to the position of said second body of sorbent material and the position of said sec- ond body of sorbent material to the position of said first body of sorbent material.

2. The method of claim 1 wherein step (f) comprises:
(g) providing a third bed of sorbent material which has been heated as in step (c) and desorbed of hydrocarbons adsorbed thereon;
(h) flowing a cool gas through said third bed of sorbent material until the bed is cooled to a temperature satisfactory for adsorption service in step (b); and
(i) periodically shifting the position of said first body of sorbent material to the position of said second body of sorbent material, the position of said second body of sorbent material to the position of said third body of sorbent material, and the position of said third body of sorbent material to the position of said first body of sorbent material.

3. The method of claim 1 wherein step (e) comprises:
(j) cooling said second stream of regenerating gas thereby condensing condensable hydrocarbons in said second stream of regenerating gas;
(k) separating uncondensed regenerating gas from said condensed hydrocarbons;
(l) removing said condensed hydrocarbons from the system;
(m) heating said uncondensed regenerating gas; and
(n) returning the heated regeneration gas of (m) to the flow of regenerating gas through said second body of sorbent material of (c).

4. The method of claim 1 wherein step (e) comprises removing in a gaseous phase a portion of said second portion of said stream of regenerating gas to maintain a maximum pressure in the regeneration system.

5. The method of claim 1 wherein said first portion of said stream of regeneration gas is replaced by a stream of enriched gas from a source extraneous to said heated stream of regenerating gas and desired hydrocarbon components are recovered from all of the heated stream of regenerating gas of step (e).

6. The method of claim 5 wherein said stream of enriched gas from an extraneous source is a single component hydrocarbon stream having between about 2 and about 6 carbon atoms per molecule.

References Cited

UNITED STATES PATENTS

| 2,799,364 | 7/1957 | Miller | 55—62 |
| 2,886,123 | 5/1959 | Miller et al. | 55—62 |
| 3,288,705 | 11/1966 | Humphries | 208—310 |
| 3,405,507 | 10/1968 | Spencer et al. | 55—62 |
| 3,479,797 | 11/1969 | Spencer et al. | 55—62 |

HERBERT LEVINE, Primary Examiner

U.S. Cl. X.R.

55—62, 180; 208—340